(12) United States Patent
Taneda et al.

(10) Patent No.: US 6,233,385 B1
(45) Date of Patent: May 15, 2001

(54) LIGHT LIMITER

(75) Inventors: Yasuhisa Taneda; Takaaki Ogata, both of Tokyo; Hirotoshi Nagata, Funabashi; Junichiro Ichikawa, Funabashi; Kaoru Higuma, Funabashi, all of (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/239,401

(22) Filed: Jan. 28, 1999

(30) Foreign Application Priority Data

Jan. 30, 1998 (JP) .................................... 10-020010

(51) Int. Cl.$^7$ ..................................................... G02B 6/00
(52) U.S. Cl. ............................................ 385/122; 359/341
(58) Field of Search ..................... 385/122–128; 359/341, 589–590

(56) References Cited

U.S. PATENT DOCUMENTS 5,608,825    3/1997    Ip .

FOREIGN PATENT DOCUMENTS 3-149504    6/1991    (JP) .
4-251202    9/1992    (JP) .
9-326759    12/1997   (JP) .

OTHER PUBLICATIONS

Electronics Letters, vol. 33, No. 21 (Oct. 9th, 1997), pp. 1812–1813, F.S. Yang et al.

Optics Letters, vol. 21, No. 8 (Apr. 15, 1996), pp. 573–575, M.E. Marhic et al.

*Primary Examiner*—James Phan
(74) *Attorney, Agent, or Firm*—Ostrolenk, Faber, Gerb & Soffen, LLP

(57) ABSTRACT

The object of the present invention is to provide a light limiter which can control the generation of an optical surge, comprises few components, and has high reliability; in order to achieve the object, the light limiter of the present invention comprise a parametric amplification element parametrically amplifying an input signal light, and a wavelength selection element removing a wavelength component, excepting a specified wavelength, from among the signal light output from said parametric amplification element.

8 Claims, 9 Drawing Sheets

LIGHT LIMITER

BACKGROUND OF THE INVENTION

1. Field of the Invention

The present invention relates to a light limiter, and in particularly, to a light limiter removing the high output signal light component of pulses (abbreviated as an optical surge) secondarily generated in an optical amplification process.

This application is based on patent application No. 10-020010 filed in Japan, the content of which is incorporated herein by reference.

2. Description of the Related Art

Recently, in order to optically amplify a signal light directly and to improve the transmission distance of the signal light, optical fiber amplifier whose cores are doped with rare earth ions such as $Er^{3+}$ and $Nd^{3+}$ (an optical fiber amplifier an alias) are required and essential in an optical communication system which can communicate in a long distance and has a mass storage.

However, the optical fiber amplifier outputs high power light; therefore, it may degrade or destroy the optical components located on a transmission line in a next step. This may be a primary factor for the degradation of the stability and reliability of an optical communication system.

In particular, secondary generating optical surges are one of the primary degradation factors of the optical components in the optical amplification process in which the signal light starts to be input to the optical fiber amplifier. When the optical fiber amplifier is excited by an exciting light having shorter wavelength than that of the signal light, and the signal light does not input thereto, the rare earth ions of high excitation level are stored in the optical fiber amplifier. When the signal light input to the optical fiber amplifier in this condition, the stored high level energy is suddenly undergoes induced-emission.

In order to prevent these optical surges, the following methods have been suggested.

FIG. 15 shows the optical fiber amplifier disclosed in Japanese Patent Application, First Publication No. Hei 06-216452. This optical fiber amplifier comprises an optical multiplexer 1, a semiconductor laser emitting apparatus 2 which emits dummy-light, a control means 3 for the semiconductor laser emitting apparatus 2, a light receiving device 4, an optical branching device 5, an optical multiplexer 6 for a multiplication of the signal light and the dummy-light, a semiconductor laser emitting apparatus 7 emitting an excited light, a driving circuit 8 for a semiconductor laser emitting apparatus 7, optical isolators 9, 11, a light amplification portion 10 of rare-earth element doped optical fiber, and an optical filter 12.

When the input signal light $S_1$ having a wavelength of $\lambda_1$ is amplified in this optical fiber amplifier, the input signal light $S_1$ is combined with the dummy-light $S_2$ having a wavelength of $\lambda_2$ being different from the wavelength $\lambda_1$ of the input signal light $S_1$ before an optical amplification process. Then, the power of the dummy-light $S_2$ is controlled so that the total amount of power between the input signal light $S_1$ and the dummy-light $S_2$ is fixed. A part of the transmission power of the composed light is branched by the optical branching device 5, and is subjected to an optical/electrical conversion (O/E conversion) by the light receiving device 4. The residue of the composed light is input to the optical multiplexer 6. The control means 3 for the semiconductor laser emitting apparatus 2 which emits dummy-light feeds back to the semiconductor laser emitting apparatus 2 which emits dummy-light so as to fix the voltage value obtained by the O/E conversion. The excited light $S_3$ having a wavelength of $\lambda_3$ output from the semiconductor laser emitting apparatus 7 emitting an excited light, the input signal light $S_1$, and the dummy-light $S_2$ are combined in the optical multiplexer 6. The combined light inputs to the light amplification portion 10 of a rare-earth element doped optical fiber, via the optical isolator 9. The light amplification portion 10 of rare-earth element doped optical fiber is excited by the excited light $S_3$. Thereby the input signal light $S_1$ and the dummy-light $S_2$ are amplified in the light amplification portion 10 of rare-earth element doped optical fiber, the dummy-light $S_2$ is removed by the optical filter 12, and then only the amplified input signal light $S_1$ is output.

When the input signal light $S_1$ is not input into the optical fiber amplifier, the energy stored in the light amplification portion 10 of the rare-earth element doped optical fiber is suddenly subjected to induced-emission; therefore, the optical surges are generated in this optical fiber amplifier. Accordingly, an optical surges are prevented by the incidence of the dummy-light $S_2$ to the light amplification portion 10 of the rare-earth element doped optical fiber when the input signal light $S_1$ is not input, and by control the light intensity of the input signal light $S_1$ and the dummy-light $S_2$ is fixed.

The light input to the a light amplification portion 10 of rare-earth element doped optical fiber is subjected not to cut off, in order to prevent the output of an optical surge in this conventional optical fiber amplifier. Therefore, the optical surge is not restricted. Accordingly, this conventional optical fiber amplifier has the problem that control the power of the generated optical surge is impossible. In addition, this conventional optical fiber amplifier has many components; therefore, its reliability may deteriorate.

In particular, the optically active components, such as a laser photogenic organ, have a worse reliability parameter (called the FIT value). It is preferable that the generation of the dummy-light which is not essential be prevented, and the number of the components is reduced in a undersea repeater which is preferably has a higher grade of reliability than that of a land-based repeater.

SUMMARY OF THE INVENTION

It is therefore an object of the present invention to provide a light limiter which can control the power of the generated optical surge, comprises a small number of components, and has high reliability.

According to an aspect of the present invention, the present invention provides a light limiter comprising a parametric amplification element parametrically amplifying an input signal light, and a wavelength selection element removing a wavelength component excepting a specific wavelength from among the signal light output from said parametric amplification element.

DESCRIPTION OF THE PREFERRED EMBODIMENTS

Figure 1:
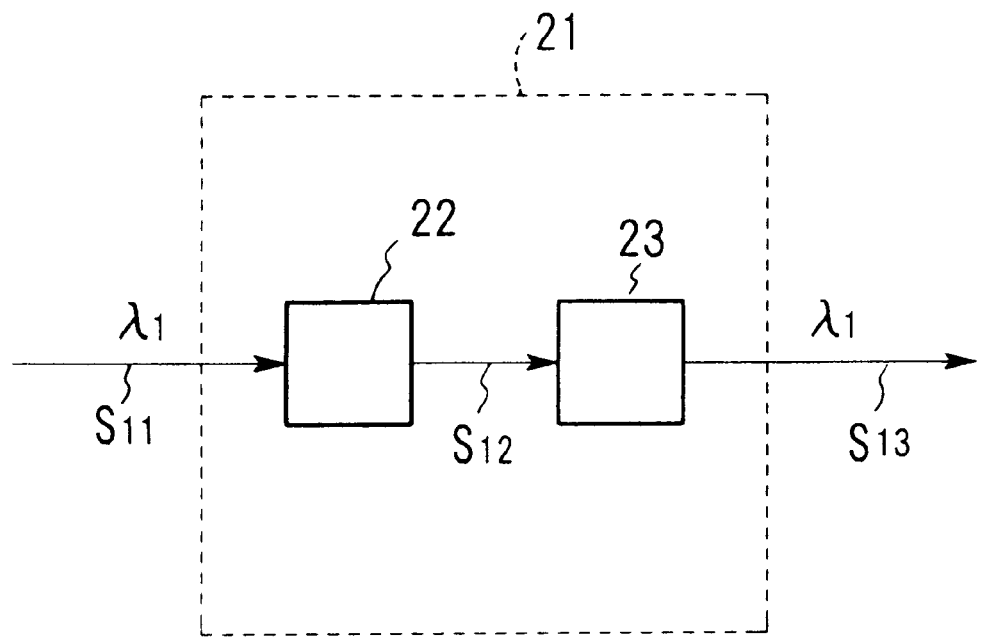
FIG. 1 shows one preferred configuration of the light limiter of the present invention.

A detailed explanation of one light limiter of the present invention will now be made. FIG. 1 shows one preferred configuration of the light limiter of the present invention. This light limiter 21 comprises the parametric amplification element 22 and the wavelength selection element 23. In this light limiter 21, the loss of the light is varied by changing the input light power, and the incidence of the signal light having power excessive for the optical components is prevented by controlling the output light power.

The parametric amplification element 22 is comprised of the optical fibers such as a dispersion-shifted optical fiber (DSF) and a dispersion-flat optical fiber. This parametric amplification element 22 induces the parametric gain by the input signal light $S_{11}$ having a wavelength of $\lambda_1$.

The wavelength selection element 23 is comprised of the dielectric multilayer optical filter. This wavelength selection element 23 removes the wavelength component, except for a specified wavelength from among the amplified signal light $S_{12}$ output from the parametric amplification element 22, and outputs the only signal light $S_{13}$ having a specified wavelength of $\lambda_1$.

This light limiter 21 amplifies the optical noise having a wavelength near the wavelength $\lambda_1$ of the input signal light $S_{11}$. For example, it amplifies a spontaneously emitted light (abbreviated as ASE light) output from the optical fiber amplifier. That is, the signal light power is converted to optical noise having a wavelength near the wavelength $\lambda_1$ of the input signal light $S_{11}$; therefore, the optical spectral band width becomes wide. When the signal light power incident to the parametric amplification element 22 becomes larger, the optical spectral band width becomes wide. Moreover, hen the transmission length of the parametric amplification element 22 is larger, the optical spectral band width becomes wide. Therefore, when the optical power components excepting the wavelength $\lambda_1$ of the input signal light $S_{11}$ which are converted to the optical noise by the wavelength selection element 23, are removed, the insertion loss increases. Accordingly, when the excessive power signal light $S_{11}$ is incident, the optical power of the signal light $S_{13}$ output from the light limiter 21 is saturated, and restricted; therefore, damage to the optical components located in the next step can be prevented.

Figure 2:
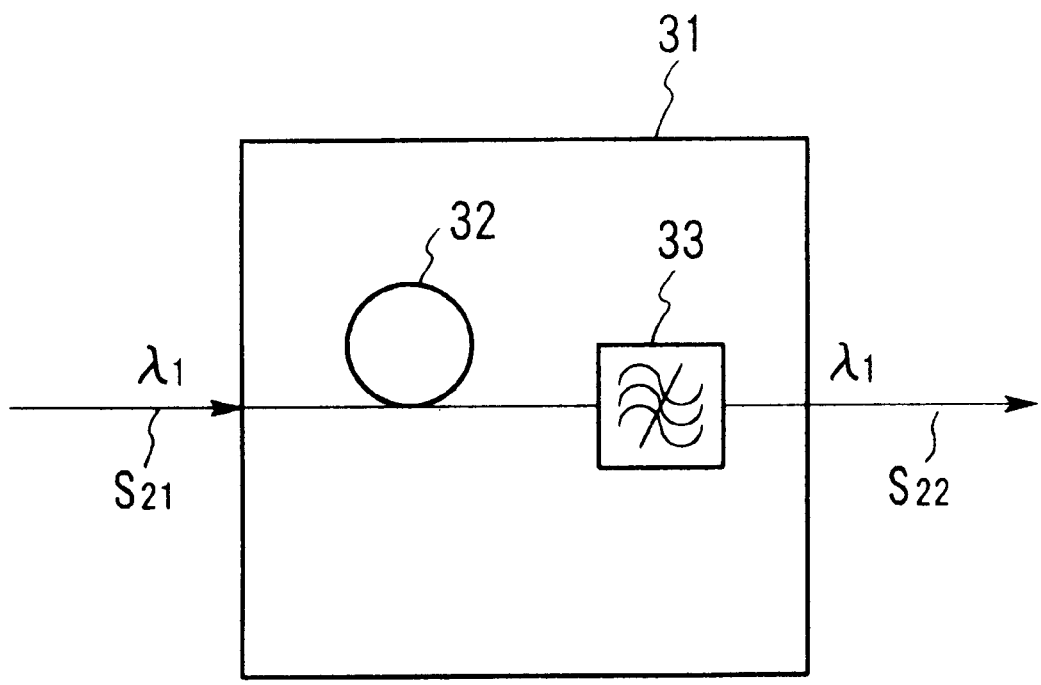
FIG. 2 shows the other preferred configuration of the light limiter of the present invention.

A detailed explanation will now be made of the other embodiment of the light limiters of the present invention using FIG. 2.

The light limiter 31 comprises a dispersion-shifted optical fiber (DSF) 32 having a zero-dispersion wavelength of 1551 nm, a transmission loss of 0.2 dB/km, a length of 16 km, and a mode field diameter (MDF) of 8 $\mu$m, and the optical filter 33 having a loss of 3 dB, a bandwidth of 0.3 nm, and a primary Butterworth form which transmits only the signal light component from among the increased optical spectral band width.

In theory, when the wavelength $\lambda_1$ of the input signal light $S_{21}$ is in the negative dispersion region, that is, is in shorter than the zero-dispersion wavelength of the dispersion-shifted optical fiber 32, the phase matching conditions for induction of the parametric gain cannot be obtained. Therefore, it is necessary that the dispersion value of the dispersion-shifted optical fiber 32 in the wavelength range used be in the positive dispersion region, that is, is in longer than the zero-dispersion wavelength of the dispersion-shifted optical fiber 32.

However, in practice, the dispersion-shifted optical fiber 32 has a dispersion value on the longitudinal axis thereof; therefore, when the dispersion value of the dispersion-shifted optical fiber 32 is near the zero-dispersion wavelength thereof, parametric gain can be obtained. Accordingly, the optical fiber 32 having an approximately zero-dispersion in the wavelength range used is used in this embodiment.

When the signal light $S_{21}$ having a wavelength $\lambda_1$ of 1556 nm, which is near the zero-dispersion wavelength, is incident to the dispersion-shifted optical fiber 32 in this embodiment, the signal light $S_{21}$ and the amplified ASE light by the optical amplifier in the proceeded step can realize the phase matching conditions for an induction of parametric gain, and then generates the parametric amplification which is one of the non-linear optical effects in the dispersion-shifted optical fiber 32. Moreover, the wavelength band of the aforementioned ASE light is wide.

Therefore, the intensity of the wavelength $\lambda_1$ of the signal light $S_{21}$ decreases when the signal light $S_{21}$ transmits into the dispersion-shifted optical fiber 32. The ASE light is parametrically amplified, and then the optical spectrum consequently increases. That is, the dispersion-shifted optical fiber 32 converts the signal light power to the wavelength range near the wavelength $\lambda_1$ of the signal light $S_{21}$, and works as a parametric amplification element increasing the optical spectral band width. The signal light $S_{22}$ having a wavelength of $\lambda_1$ is emitted by removing the wavelength component, except a specified wavelength by the optical filter 33, from among the signal light $S_{21}$ having an increased spectral band width.

Figure 3:
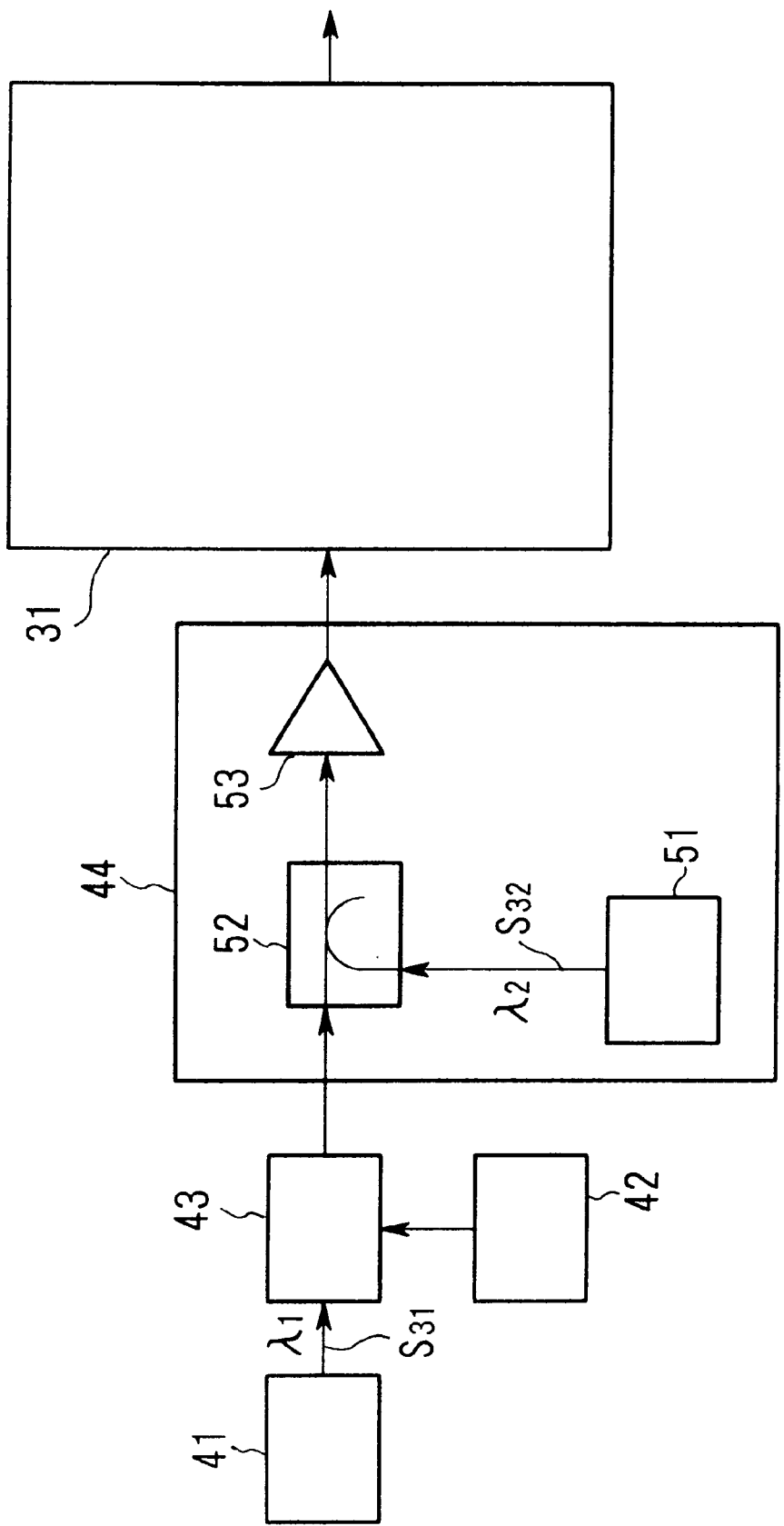
FIG. 3 shows an experimental system for an investigation of optical properties of the light limiter of the present invention.

FIG. 3 shows an experimental system for an investigation of optical properties of the light limiter of the present embodiment. This experimental system comprises a signal light source 41 which is a dispersion-feedback type laser (MQW-DFB-LD) having a multiplex quantum well structure and which emits the signal light $S_{31}$ having a wavelength of $\lambda_1$, an oscillator 42, an acousto-optical switch (O/A switch) 43, an optical amplifier 44, and a light limiter 31 which is an object to be measured.

The optical amplifier 44 comprises an excitation light source 51 comprising semiconductor laser, an optical multiplexer 52 for a multiplexing the excited light $S_{32}$ having a wavelength of $\lambda_2$ emitted from the excitation light source 51 comprising semiconductor laser and the signal light $S_{31}$ emitted from the acousto-optical switch 43, and $Er^{3+}$doped optical fiber amplifier (EDFA) 53.

In this experimental system, the excited light $S_{32}$ having a wavelength of $\lambda_2$, 1460 nm emitted from the excitation light source 51 comprising semiconductor laser incident to the EDFA 53, via the optical multiplexer 52; therefore, the EDFA 53 is in an excited condition. Moreover, the output power of the optical amplifier 44 is restricted so as to be +6 dBm at stationary state. The signal light $S_{31}$ having a wavelength of $\lambda_1$, 1556 nm emitted from the signal light source 41 is input to the acousto-optical switch 43. The transmission light of the acousto-optical switch 43 is turned ON/OFF by outputting a rectangular modulating signal having a frequency of 10 Hz from the oscillator 42. When the intermittent light is incident to the optical amplifier 44 for the duration of these steps, the signal light having an optical surge outputs from the optical amplifier 44, as stated above, and is incident to the light limiter 31.

The experiments were carried out to confirm the operation and effects for the light limiter 31 (21) of these embodiments by use this experimental system.

In this experiment, it is confirmed that the optical spectral band width is increased by the parametric amplification in the dispersion-shifted optical fiber 32 by exchanging the optical surge peak power. The inhibiting effect for the optical surge peak was examined by varying the fiber length of dispersion-shifted optical fiber 32, and then the most suitable length thereof was examined. In addition, in order to quantitatively confirm the inhibiting effect, the efficiency of the light limiter 31 (21) of these embodiments was examined by measuring the attenuation characteristics and input/output characteristics of the optical surge peak power.

These experimental results are shown in FIGS. 4 to 14.

Figure 4:
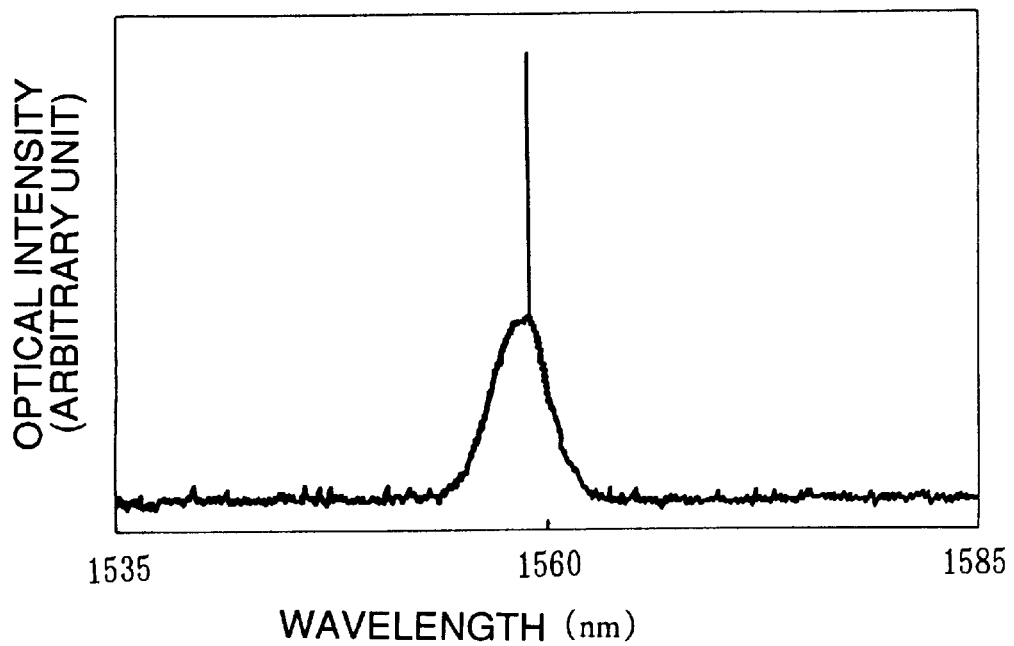
FIG. 4 shows the optical spectrum waveform output from the optical amplifier before a transmission in a dispersion-shifted optical fiber.

FIGS. 4 to 8 show that the optical spectral band width is increased by the parametric amplification. In addition, FIG. 4 shows that the optical waveform output from the optical amplifier 44 before transmission in a dispersion-shifted optical fiber 32. The light having a peak wavelength at 1556 nm is the amplified signal light, and the optical spectra having a wide-band excepting the peak wavelength of 1556 nm are the ASE light.

Figure 5:
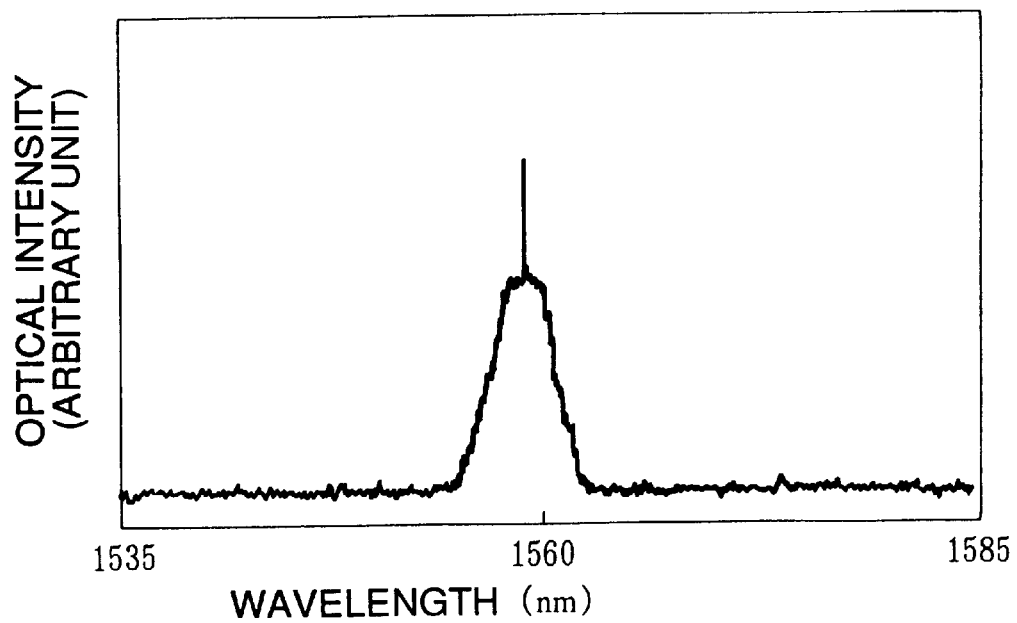
FIG. 5 shows the optical spectrum of the optical surge having a peak power of 400 mW after a transmission of 16 km in a dispersion-shifted optical fiber.
Figure 6:
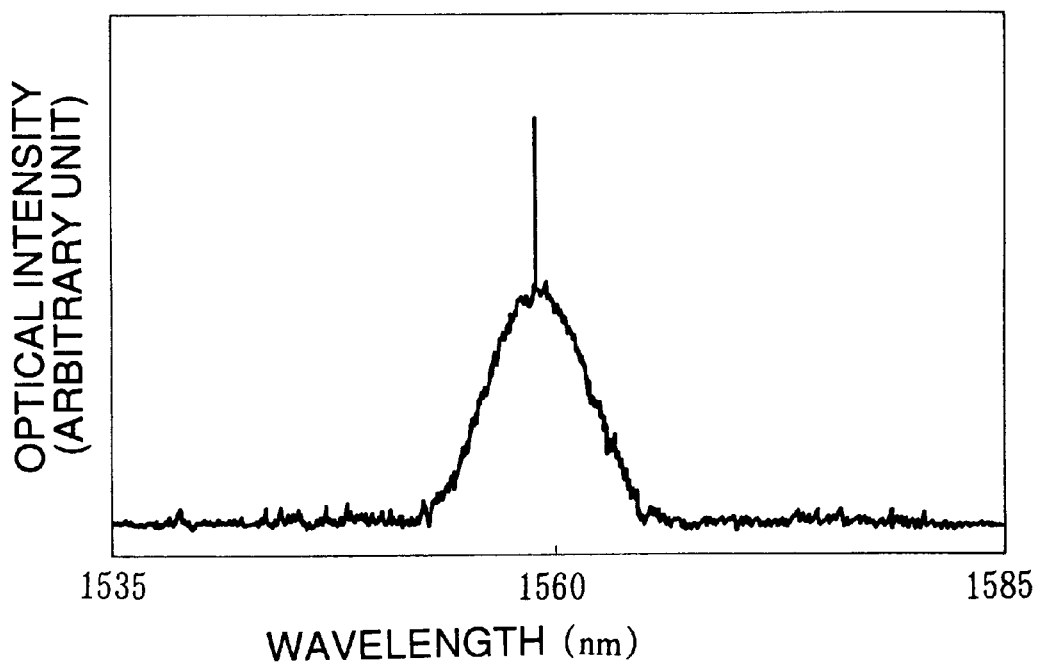
FIG. 6 shows the optical spectrum of the optical surge having a peak power of 800 mW after a transmission of 16 km in a dispersion-shifted optical fiber.
Figure 7:
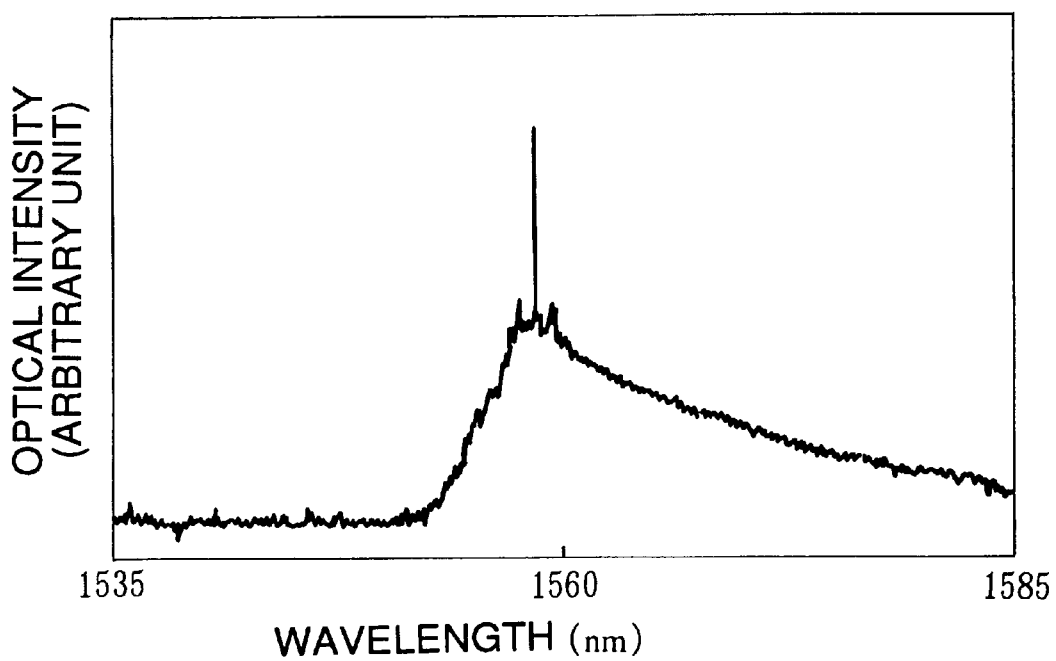
FIG. 7 shows the optical spectrum of the optical surge having a peak power of 2180 mW after a transmission of 16 km in a dispersion-shifted optical fiber.

FIGS. 5 to 7 show the optical spectrum after a transmission of 16 km in a dispersion-shifted optical fiber 32 when the optical surge peak power output from the optical amplifier 44 was varied. In addition, FIGS. 5 to 7 show the optical spectrum of the optical surge having a peak power of 400 mW, 800 mw, and 2180 mW, respectively.

It can be understood from FIGS. 5 to 7 that as the optical surge having a high output induces the parametric gain of the dispersion-shifted optical fiber 32, the wavelength components near the signal light increases. In addition, the effect for an increase of the optical spectrum by the parametric amplification increases depending on the increase of the optical surge peak power input to the dispersion-shifted optical fiber 32.

Figure 8:
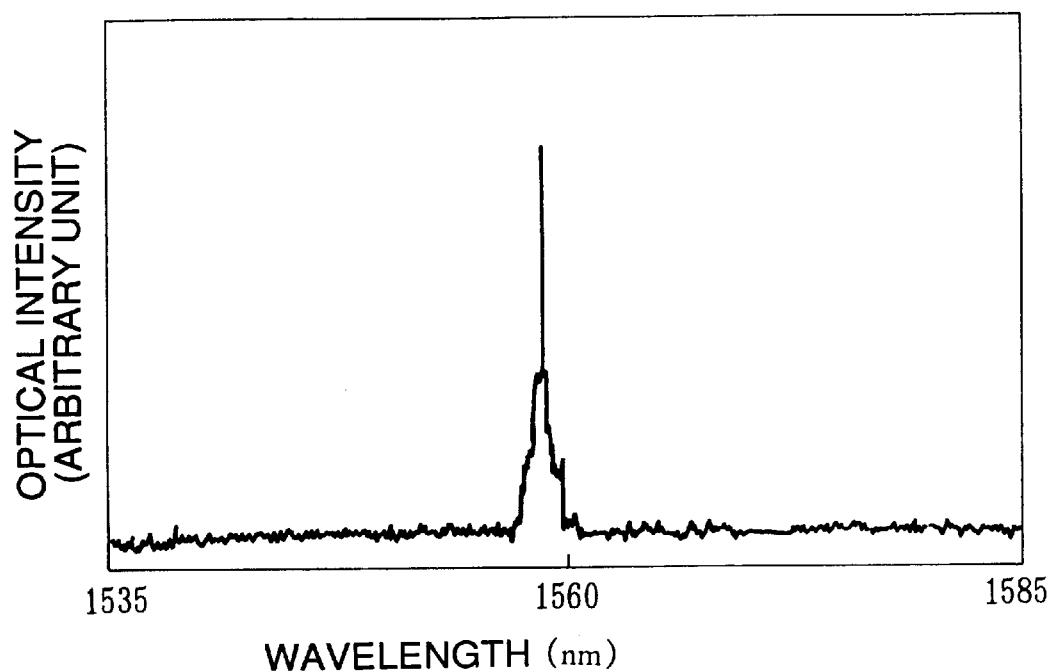
FIG. 8 shows the optical spectrum of the optical surge after a transmission of 16 km in a dispersion-shifted optical fiber and a passage through an optical filter.

FIG. 8 shows the optical spectrum of the optical surge passing through the optical filter 33 having the transmission wavelength band of 0.3 nm after a transmission of 16 km in a dispersion-shifted optical fiber 32. It is clear from FIG. 8 that the light power except the signal light component is removed by the optical filter 33.

Figure 9:
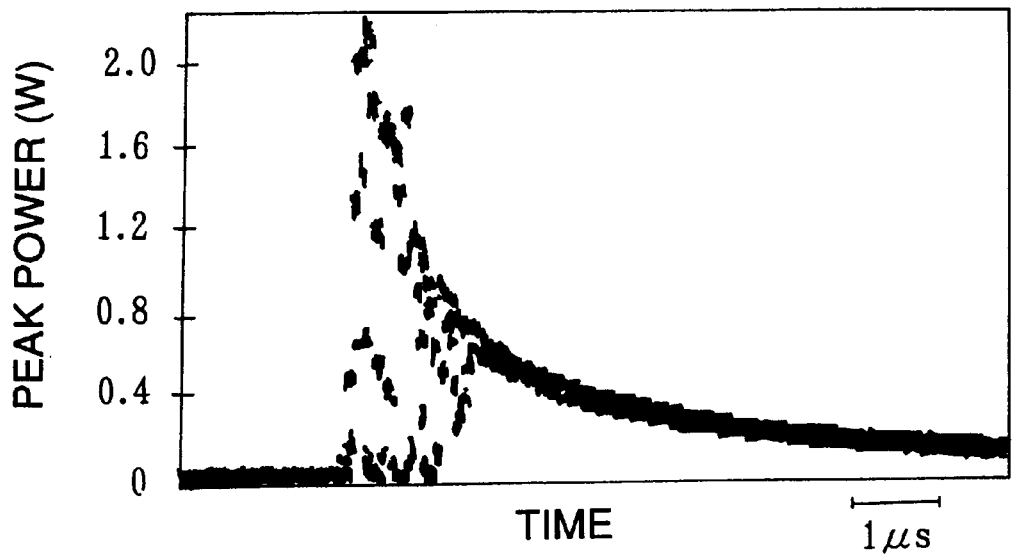
FIG. 9 shows the waveform change of the optical surge in the output portion of the optical amplifier as a function of time.

FIG. 9 shows the change in the optical surge waveform in the output portion of the optical amplifier 44 as a function of time. It is clear from FIG. 9 that when the intermittent light from the acousto-optical switch 43 is amplified, the optical surge is generated the instant the signal light is input. This fact can be confirmed again. Moreover, the optical surge peak power is 2000 mW.

Figure 10:
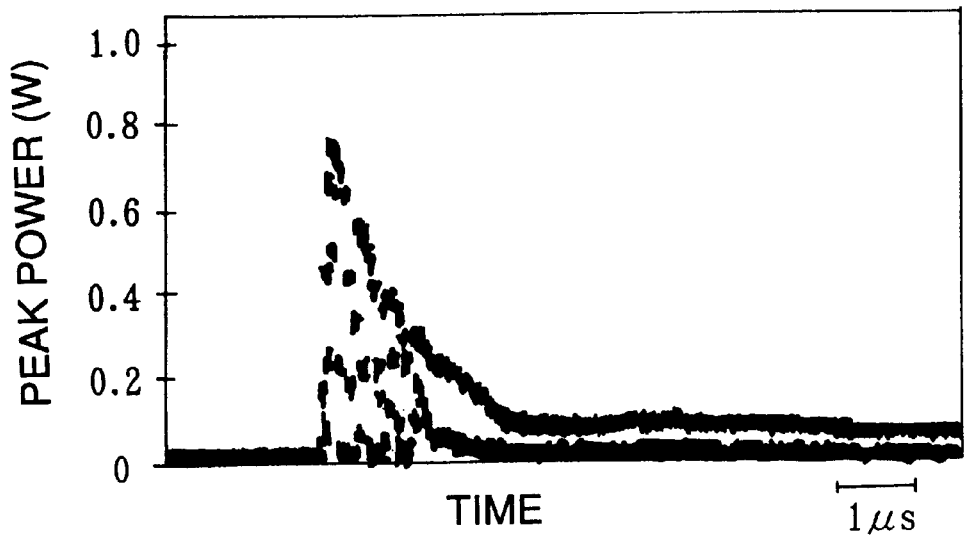
FIG. 10 shows the waveform change of the optical surge as a function of time, which transmits at 8 km in a dispersion-shifted optical fiber, passes through an optical filter, and is output.
Figure 11:
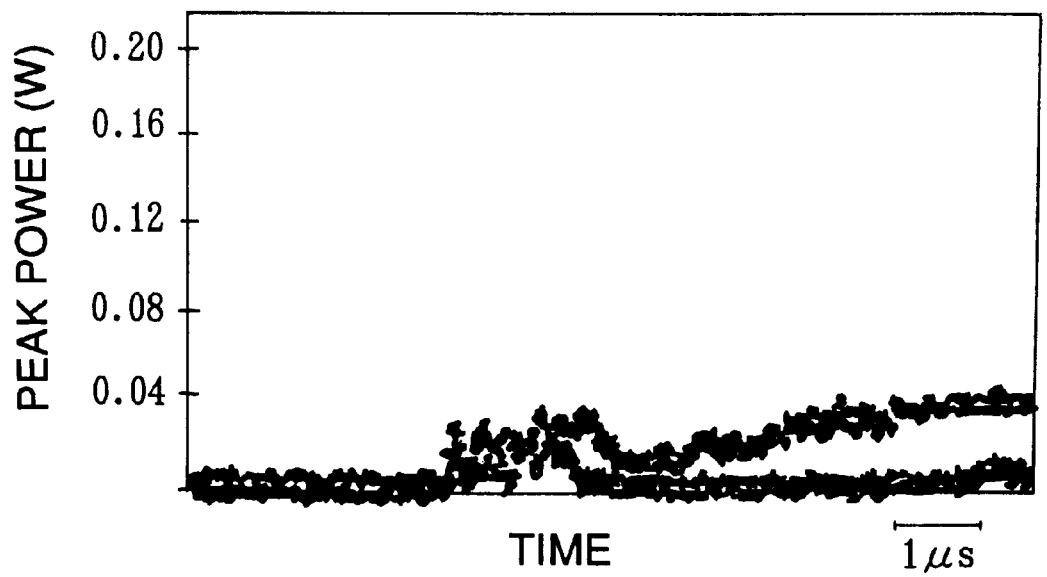
FIG. 11 shows the waveform change of the optical surge as a function of time, which transmits at 16 km in a dispersion-shifted optical fiber, passes through an optical filter, and is output.
Figure 12:
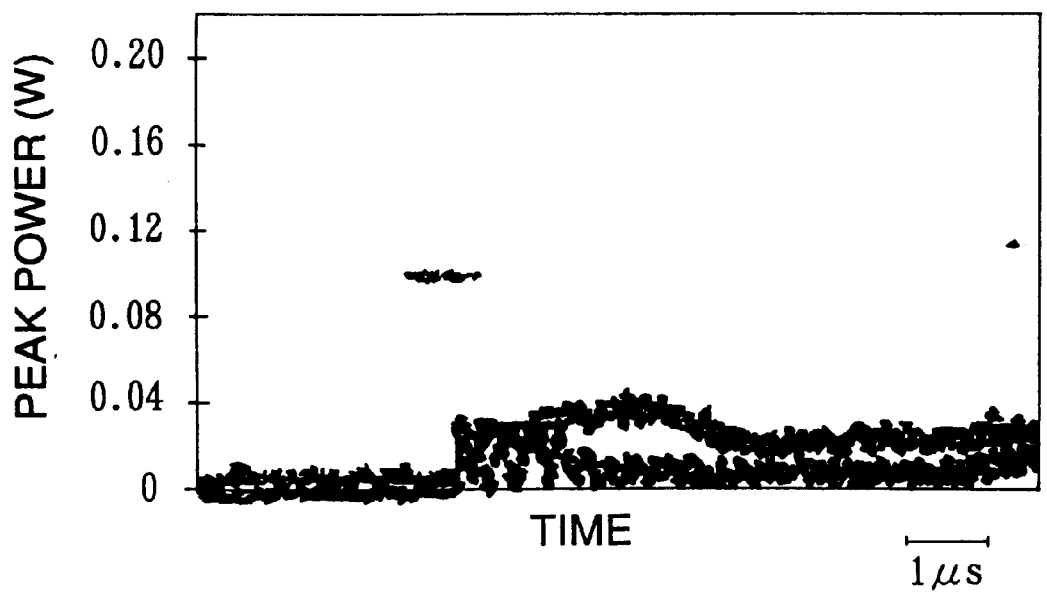
FIG. 12 shows the waveform change of the optical surge as a function of time, which transmits at 24 km in a dispersion-shifted optical fiber, passes through an optical filter, and is output.

FIGS. 10 to 12 show the change in the optical surge waveform at the output portion of the optical filter as a function of time. In these Figures, the waveform of the optical surge emitted from the optical amplifier 44, transmitted in the dispersion-shifted optical fiber 32, and passed through the optical filter 33 having a transmission wavelength band of 0.3 nm, was examined by changing the length of the dispersion-shifted optical fiber 32. FIGS. 10 to 12 show the waveform of the optical surge after a transmission of 8 km, 16 km, and 24 km, respectively.

It is clear from these Figures that the dispersion-shifted optical fiber 32 having a length of 8 km cannot sufficiently inhibit the input optical surge having a peak power of 2000 mW. In addition, in order to sufficiently inhibit the input optical surge, the length of the dispersion-shifted optical fiber 32 must be more than 16 km. When the length of the dispersion-shifted optical fiber 32 is 16 km, the optical peak power is reduced to approximately 1/50.

Figure 13:
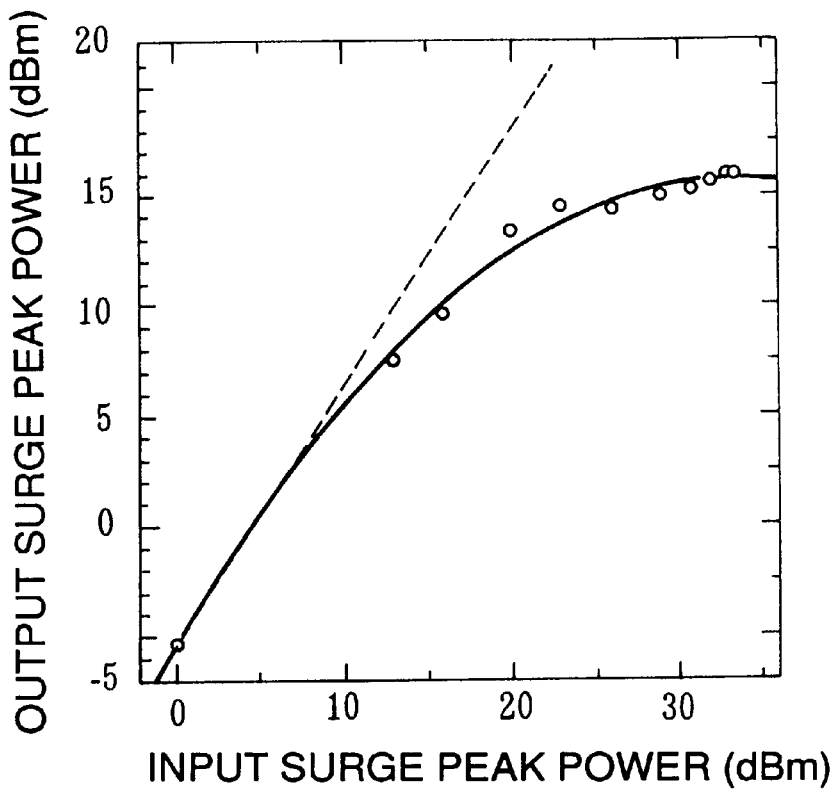
FIG. 13 shows the input-output property of the optical surge peak power.

FIG. 13 shows the input-output characteristics of the optical surge peak power. It is clear from FIG. 13 that the output peak power is saturated and the peak power over +16 dBm is not transmitted to the next step.

Figure 14:
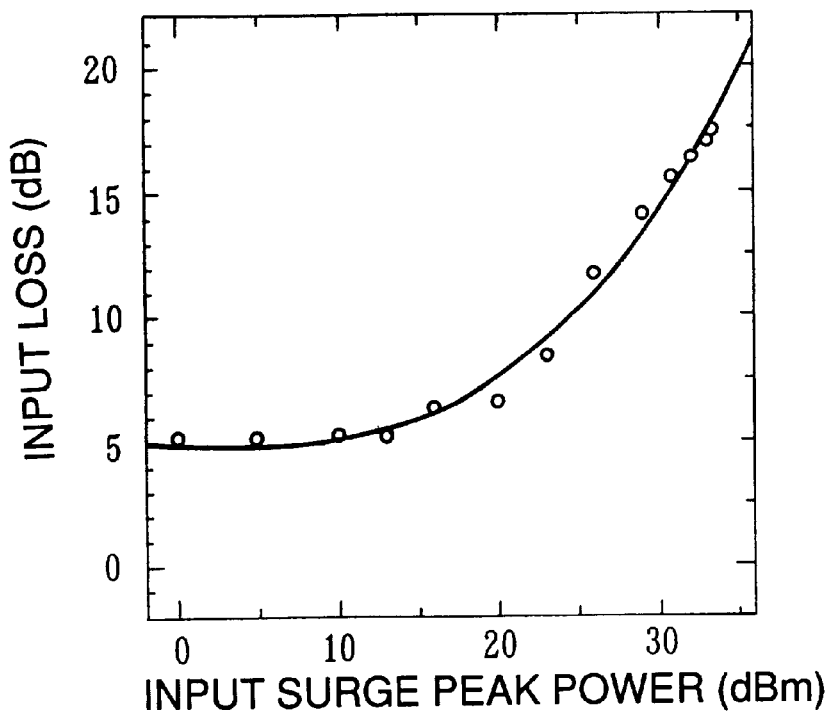
FIG. 14 shows the insertion loss to the input optical surge peak.
Figure 15:
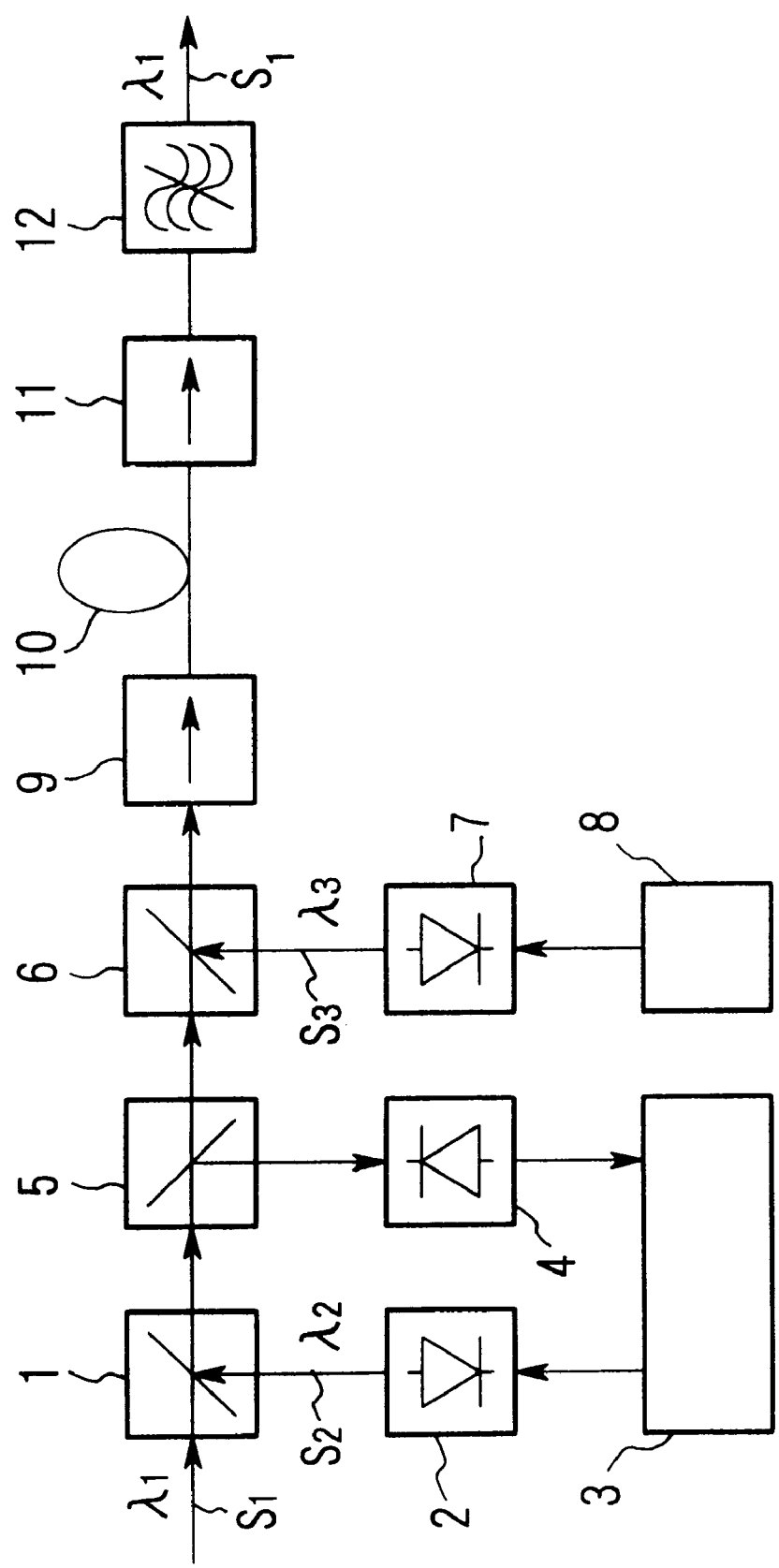
FIG. 15 shows one of the conventional optical fiber amplifiers.

FIG. 14 shows the insertion loss to the peak power of the input light surge. It is clear from FIG. 14 that when the input optical surge peak power is+20 dBm or less, the insertion loss is fixed at 5.2 dB; however, when the input optical surge peak power is+20 dBm or more, the insertion loss increases; therefore, the light limiter works satisfactorily.

As stated above, the signal light power is power-converted to the optical noise having a wavelength near the signal light, the optical spectral band width is increased, and then the wavelength component, except the signal light, is removed with the optical filter 33 by use of parametric amplification in the dispersion-shifted optical fiber 32 in the light limiters of these embodiments. Therefore, it can control the optical surge which damages or degrades the system components, such as receiving light.

In addition, when the input power of the signal light is larger, the optical spectral band width becomes wide. However, when the widened optical spectral band width of the signal light is less than the transmission band range of the optical filter 33, the signal light can transmit the optical filter 33. That is, when the input power of the signal light is not large, the amount of attenuation of the signal light power is small; therefore, the influence on the signal light can be reduced.

The optical filter 33 having a transmission wavelength band of 0.3 nm is used as a selection element for selecting only the signal light component from among the increased optical spectra after a transmission in the dispersion-shifted optical fiber 32 in these embodiments. However, the optical circulator and the optical fiber grating which have wavelength selection characteristics by treating a core portion, that is, a waveguide portion of an optical fiber so as to periodically convert the refractive index thereof, instead of the optical filter 33. In addition, the Fabry-Perot etalon filter, in which periodically transmitting wavelength appear, can be also used.

Recently, the wavelength multiplex transmission system (WDM system) which increases the transmission capacity has drawn attention. When the transmission wavelength of the Fabry-Perot etalon filter is controlled so as to correspond to the signal light wavelength of International Standard which is used in the WDM system, the light limiters of these embodiments can be independently applied to all signal light wavelengths using in the WDM systems.

The dispersion-shifted optical fiber 32 having a zero-dispersion wavelength near the signal light wavelength are used as a parametric amplification element in these embodiments; however, the waveguide type optical devices provided with the nonlinear optical crystal selected from the group consisting of $KTiOPO_4$, $KTiOAsO_4$, $\beta\text{-}BaB_2O_4$, and $LiNbO_3$ can also be used.

What is claimed is:

1. A light limiter comprising:

a parametric amplification element which parametrically amplifies an input signal light having an optical surge to produce an output signal, said parametric amplification element including an optical fiber having a length of about 16 km which inhibits the transmission of the optical surge in the output signal; and a wavelength selection element which selects a specified wavelength component from said output signal and emits a signal having said specified wavelength component.

2. A light limiter according to claim 1, wherein said optical fiber is one optical fiber selected from the group consisting of a dispersion-shifted optical fiber and a dispersion-flat optical fiber.

3. A light limiter according to claim 1, wherein said parametric amplification element is an optical waveguide element provided with a nonlinear optical material.

4. A light limiter according to claim 3, wherein said nonlinear optical material is one material selected from the group consisting of $KTiOPO_4$, $KTiOAsO_4$, $\beta\text{-}BaB_2O_4$, and $LiNbO_3$.

5. A light limiter according to claim 1, wherein said wavelength selection element is an optical filter.

6. A light limiter according to claim 5, wherein said optical filter is a dielectric multilayer optical filter.

7. A light limiter according to claim 1, wherein said wavelength selection element comprises an optical circulator and an optical fiber grating.

8. A light limiter according to claim 1, wherein said wavelength selection element is a Fabry-Perot etalon filter.

* * * * *